June 18, 1946.     F. A. PRITCHARD     2,402,447
ADJUSTABLE CAM MEMBER
Filed June 8, 1943
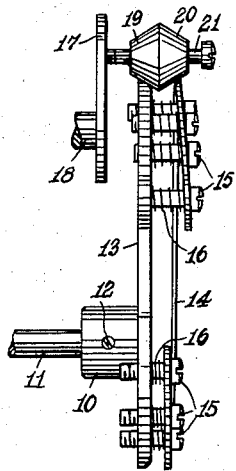
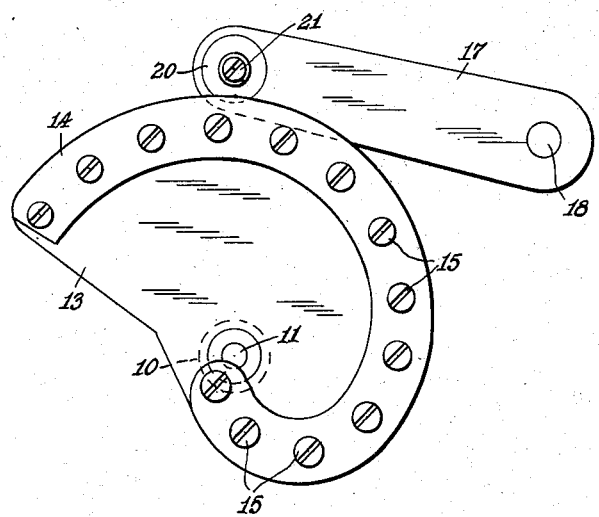
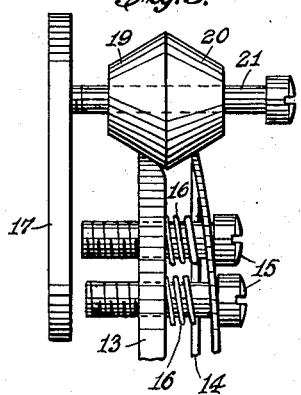
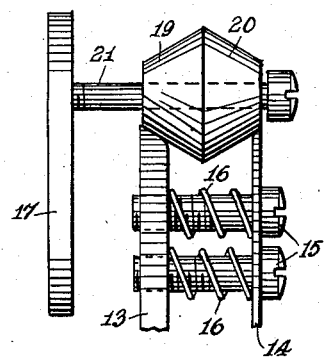
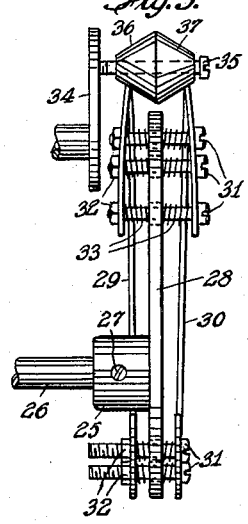
INVENTOR.
FREDERICK A. PRITCHARD
BY
ATTORNEY.

Patented June 18, 1946

2,402,447

UNITED STATES PATENT OFFICE 2,402,447

ADJUSTABLE CAM MEMBER

Frederick A. Pritchard, Waterbury, Conn., assignor to The Bristol Company, Waterbury, Conn., a corporation of Connecticut Application June 8, 1943, Serial No. 490,014

12 Claims. (Cl. 74—568)

This invention relates to adjustable cams, and more especially to a cam member forming a transmission element in the mechanical train of a measuring or controlling system. In the use of a cam as an element in a mechanical linkage for measurement or control, it is obvious that accurate operation of the system demands extreme precision in the displacement of the cam follower as related to the position of the cam, and that, whenever quantity production methods may be used in the forming of said cams, there will be many instances where the final incorporation of the law connecting the deflection of the cam and the displacement of the follower will require delicate individual adjustment. Heretofore, it has been customary to effect such adjustments by filing and honing the cam profile; but it will be apparent that such a method of adjustment cannot be used, for example, to increase the radius of an undersized cam, and that, however skilled the mechanic so engaged, the said method is tedious, expensive, and subject to severe limitations.

It is an object of this invention to provide a construction of cam member whereby the relation between displacement of the cam member with respect to the associated follower may be readily and precisely adjusted.

It is a further object of the invention to provide a construction of cam member which will enable adjustments to be made therein in a sense either to increase or to decrease the effective operating distance between its axis of movement and the center of the follower.

It is a further object to provide a cam member having adjustable cam means in which adjustment may be made with micrometer precision.

It is a further object to provide an adjustable cam element in which the effective radius or operating distance at different points along the contour of the cam means may be differently adjusted.

It is a further object to provide adjustable cam means in which adjacent portions of the contour shall always be connected with smooth gradients.

It is a further object to provide a cam member construction which admits of the desired adjustments being effected, in general, without necessitating removal of the cam member from its mounted position in the apparatus with which it is to be used.

It is a further object to facilitate production of a cam member on a quantity basis by providing a construction thereof admitting a single design adaptable to use with a number of different primary devices following characteristic laws in which the exponents are only slightly different.

In carrying out the invention, provision is made for varying the lateral displacement between two separated cam elements of like peripheries conformed to the desired profile of the cam, a follower having two oppositely inclined surfaces being adapted to cooperate through its said surfaces respectively with said peripheries. The effective radius of the follower will be determined by the extent to which it is permitted to drop into the space between the separated cam elements which is adjustable uniformly or variably along the cam elements.

The nature of the invention, however, will best be understood when described in connection with the accompanying drawing, in which:

Figs. 1 and 2 are side and front elevations, respectively of a cam member and follower combination embodying the principles of the invention, a number of the adjusting screws being omitted in Fig. 1 to avoid confusion in the illustration.

Figs. 3 and 4 are fragmentary side elevations, on an enlarged scale, of a portion of the cam member and the follower shown in the preceding figures, illustrating the same in the relative positions occupied corresponding to different adjustments within the scope of the invention, some of the adjusting screws being omitted.

Fig. 5 is a fragmentary side elevation of an alternative form of the invention, also with some of the adjusting screws omitted.

Referring to Figs. 1 and 2, 10 designates a hub secured to a rotatable supporting shaft 11 by means of a set screw 12, said hub having fixed thereto one element of the novel cam member, i. e., a cam plate 13 which may be formed of metal or other rigid material and has its periphery shaped to a contour similar to that of the desired cam. A cooperating element of the cam means is constituted of a curved resilient strip 14 formed of thin spring metal or similar material, and it is formed to have an outer periphery identical in profile with that of the cam plate 13. Provision is made to mutually attach these two cam elements to each other by means of screws 15 spaced lengthwise thereof near the periphery of said plate 13, the same being threaded therein and passing through clearance holes in the strip 14. Each of the screws 15 is surrounded by a small compression spring 16, whereby the strip 14 is forced away from the face of the plate 13 into intimate contact with the heads of the screws 15.

With this construction, the spacing of the strip 14 from the plate 13 in a sense parallel to the axis of the shaft 11 is made adjustable in accordance with the amount to which individual screws 15 are tightened into said plate to displace strip 14 laterally of plate 13. Because of the continuity of said strip 14, there will be no abrupt transitions from one spacing distance to another.

The two elements 13 and 14 thus constitute an adjustable cam means adapted for cooperation with a suitable follower. For example, a follower-arm 17, pivoted for oscillation through a limited angle with a shaft 18 displaced from the shaft 11, carries a roller or follower adapted to engage the cam means for actuation thereby. The roller takes the form of a pair of preferably identical truncated cones 19 and 20 with adjacent abutting bases, the conical surfaces of the cones 19 and 20 engaging the conformed edges or peripheries of the plate 13 and the strip 14, respectively. Said edges may be expediently be slightly rounded, or bevelled to an angle corresponding with that of the conical surfaces of the cones 19 and 20, in order to provide a definite bearing for said roller. The latter is centrally bored through, and is journalled upon an extended screw or post 21 secured to and extending laterally from the follower arm 17, whereby said roller may rotate freely and at the same time be permitted a limited translatory or axial movement with respect to said post.

The action of the combination of the cam member and roller constituting the invention will be better understood by reference to Figs. 1, 3 and 4. In Fig. 1 the strip 14 is shown as having different parts of its periphery at different adjusted distances from the plate 13, the portion engaged by the roller surfaces 19 and 20 being near the middle of the range of adjustment. The contours of the cam plate and the strip being identical, the roller by virtue of its conical conformation will assume a position along the post 21 where the common base of the two conical surfaces will lie substantially in a plane midway between the lines of contact between said faces and said cam elements; and the distance of the axis of the post 21 from the point of engagement between the cam surfaces and the roller will be the radius of the roller at the line of contact.

If the screws 15 be tightened, bringing the flexible strip 14 closer to the plate 13, as shown in Fig. 3, the roller will ride upon portions of the conical surfaces 19, 20 closer to the median line, and therefore be of increased radius, with a consequent corresponding increase in the distance between the axis of the post 21 and that of the shaft 11. On the other hand, if the screws 15 be loosened at any location about the periphery, the springs 16 will cause the strip 14 to be forced away from the plate 13, as shown in Fig. 4, and the roller will shift to a position where it rides on its smaller radii, with a corresponding lessening in the inter-axial distance between the cam-follower and the cam-shaft.

There has thus been provided a combination of cam member and cam-follower, wherein the effective height of the follower with respect to the advance of the cam member may be adjusted in either radial direction with micrometer precision and without abrupt transition between adjacent portions of the operating periphery.

In Fig. 5 is shown an alternative combination of cam member and roller embodying the principles of the invention. A hub 25, secured to a rotatable supporting shaft 26 by means of a set screw 27, has fixed thereto a scroll-plate 28 formed of metal or other rigid material, and having its periphery shaped to a contour similar to that of the desired cam member but of smaller radius at all points than the minimum working radius required of said cam member. Two strips 29 and 30 of material flexible in a sense parallel to the axis of rotation of the shaft 26 but substantially unyielding in a sense radial thereto, and which may expediently be formed of thin sheet metal, are provided with peripheral contours conformed to identical profiles corresponding to the basic profile of the desired cam member. These strips are spaced on opposite sides of the scroll-plate 28 and are attached thereto by means of screws 31 passing through corresponding holes circumferentially spaced about said scroll-plate and said strips and threaded into nuts 32. On each side of the plate 28 and surrounding the individual screws 31 are small compression springs 33, serving to maintain the strips 29 and 30 at their maximum spacing uniformly on the two sides of the scroll-plate and in firm contact with the heads of the screws 31 and the engaging nuts 32, respectively.

Cooperating with the cam structure constructed as set forth is a follower including a deflectable arm 34 carrying a pivot member 35, having journalled thereon a follower roller similar to the previously described roller with the two conical faces 36 and 37 with juxtaposed bases, and resting with one of said faces on the respective peripheries of each of the strips 29 and 30.

Because of the symmetry of construction of the assembly as thus far set forth, the strips 29 and 30, whatever their relative adjusted position, will tend to lie equidistant from the plane of the scroll-plate 28, so that provision need not, generally, be made for end play or translatory movement of the roller, and the pivot member 35 need have only normal running clearance between its ends and the corresponding ends of the roller.

The operation of the combination, as set forth, is substantially identical with that shown in Figs. 1 to 4. Tightening of the screws 31 into the corresponding nuts 32 will tend to bring the strips 29 and 30 closer together, while the action of the springs 33 will be to maintain them at equal distances on the two sides of the scroll-plate 28. As the distance between the strips is lessened, the roller will be constrained to ride on larger radius portions of its conical surfaces 36 and 37, respectively, and as the screws 32 are loosened and the strips 29 and 30 thereby caused to separate, the roller will tend to ride on the smaller radius portions, the difference in radii corresponding to the different settings of the screws 32 appearing in the interaxial distance between the cam member and its follower, whereby, as in the previously described embodiment of the invention, the desired adjustment is obtained.

I claim:

1. Motion transmitting means, comprising a movable cam member having two elements of like periphery, each having a dimension progressively varied to provide a conformation of said periphery to a desired contour, said elements being laterally spaced apart and in a sense perpendicular to the variation of said dimensions, both of said elements being substantially non-deformable in the sense of said dimensional variation, and one at least of said elements being flexibly deformable in the direction of said spacing, whereby the spacing between said elements may be varied by smooth gradations, and a follower mounted to deflect in a sense substantially normal to the direction of lateral deformation, said follower having two inclined surfaces for cooperation respectively with said peripheries of the cam member elements whereby the deflected position of said follower will be affected by the spacing of said elements.

2. The motion transmitting means of claim 1, wherein the inclined surfaces of the follower are oppositely disposed.

3. The motion transmitting means of claim 1, wherein the follower is constituted of two truncated cones with their bases juxtaposed.

4. The motion transmitting means of claim 1, wherein the follower is constituted of two identical truncated cones with their bases juxtaposed.

5. The motion transmitting means of claim 1, wherein the follower is rotatable and axially displaceable along its axis of rotation.

6. The motion transmitting means of claim 1, wherein the follower is mounted to deflect in a plane parallel to the plane of travel of the cam member.

7. The motion transmitting means of claim 1, wherein the follower is mounted to deflect in a sense substantially normal both to the direction of motion and the lateral displacement of said elements.

8. The motion transmitting means of claim 1, wherein the two elements of the cam member are mutually attached by the adjustable means.

9. The motion transmitting means of claim 1, wherein the means to effect the relative lateral deformation between the elements comprises individually adjustable screws passing freely through one of the elements and into the other and which are disposed lengthwise of the same.

10. The motion transmitting means of claim 1, wherein individually adjustable screws pass freely through the flexible element and are anchored in the other element which is rigid, together with cooperating compression springs located between the elements about the respective screws, the heads of the latter affording stops for the flexible element with respect to the action of the springs thereon.

11. The motion transmitting means of claim 1, wherein both of the elements of the cam member are flexible and there is provided intermediate the same a rigid cam element of periphery similar to that of the two elements but of lesser radius than the required working range of the cam member, the adjustable means for the two flexible elements passing through both and through the rigid element and being supported by the latter.

12. Motion transmitting means comprising movable cam means conformed to provide line contact of predetermined contour, a follower constrained for a principal deflection in a sense substantially normal to the direction of motion of said cam means, said follower having the form of a roller with conical surface adapted to engage said cam means and also being adapted for limited lateral translation in a sense perpendicular to both the motion of said cam means and the normal deflection of said follower, said cam means including a flexible element contacting the follower and adjustably deformable in a sense parallel to said lateral translation to a variable contour for influencing, according to a predetermined law represented by said contour, the translated position of said follower.

FREDERICK A. PRITCHARD.